United States Patent
Bheda et al.

(10) Patent No.: US 11,117,311 B2
(45) Date of Patent: Sep. 14, 2021

(54) AMORPHOUS POLYARYLETHERKETONE AND BLENDS THEREOF FOR USE IN ADDITIVE MANUFACTURING

(71) Applicant: Arevo, Inc., Saratoga, CA (US)

(72) Inventors: Hemant Bheda, Saratoga, CA (US); Riley Reese, Sunnyvale, CA (US)

(73) Assignee: Arevo, Inc., Milpitas, CA (US)

( * ) Notice: Subject to any disclaimer, the term of this patent is extended or adjusted under 35 U.S.C. 154(b) by 611 days.

(21) Appl. No.: 14/874,963

(22) Filed: Oct. 5, 2015

(65) Prior Publication Data

US 2017/0096576 A1 Apr. 6, 2017

(51) Int. Cl.

| | |
|---|---|
| *B29C 64/118* | (2017.01) |
| *B33Y 70/00* | (2020.01) |
| *C08L 71/00* | (2006.01) |
| *C08L 71/10* | (2006.01) |
| *G03G 15/22* | (2006.01) |
| *B33Y 10/00* | (2015.01) |
| *C09D 161/16* | (2006.01) |
| *G03G 15/00* | (2006.01) |
| *B29K 71/00* | (2006.01) |
| *B29K 105/16* | (2006.01) |

(52) U.S. Cl.
CPC ............ *B29C 64/118* (2017.08); *B33Y 10/00* (2014.12); *B33Y 70/00* (2014.12); *C08L 71/00* (2013.01); *C08L 71/10* (2013.01); *C09D 161/16* (2013.01); *G03G 15/00* (2013.01); *G03G 15/224* (2013.01); *G03G 15/225* (2013.01); *B29K 2071/00* (2013.01); *B29K 2105/16* (2013.01); *B29K 2105/162* (2013.01); *B29K 2995/004* (2013.01); *B29K 2995/0039* (2013.01)

(58) Field of Classification Search
CPC .......... B33Y 70/00; C08J 3/005; B29C 64/20
See application file for complete search history.

(56) References Cited

U.S. PATENT DOCUMENTS

| | | | |
|---|---|---|---|
| 4,175,175 | A | 11/1979 | Farnham et al. |
| 4,713,426 | A | 12/1987 | Harris et al. |
| 5,070,157 | A | 12/1991 | Isayev et al. |
| 5,147,936 | A | 9/1992 | Peszkin et al. |
| 5,342,664 | A | 8/1994 | Drotloff et al. |

(Continued)

FOREIGN PATENT DOCUMENTS

| | | |
|---|---|---|
| CN | 1659320 A | 8/2005 |
| CN | 101309969 A | 11/2008 |

(Continued)

OTHER PUBLICATIONS

Hsaio and Sauer, Glass Transition, Crystallization, and Morphology Relationships . . . , Journal of Polymer Science: Part B: Polymer Physics, vol. 31, p. 901-915 (Year: 1993).*

(Continued)

*Primary Examiner* — Matthew J Daniels
*Assistant Examiner* — Andrew D Graham
(74) *Attorney, Agent, or Firm* — Wayne S Breyer; Sujatha Vathyam

(57) ABSTRACT

A material for use in a fused filament fabrication (FFF) printer comprises a polyaryletherketone (PAEK) having an amorphous morphology. In some embodiments, the material also includes a PAEK having a semi-crystalline morphology.

14 Claims, 2 Drawing Sheets

(56) References Cited

U.S. PATENT DOCUMENTS

| | | | | |
|---|---|---|---|---|
| 5,747,560 | A | * | 5/1998 | Christiani ................ C08K 9/04 523/209 |
| 5,844,036 | A | * | 12/1998 | Hughes .................... C08K 7/00 524/494 |
| 5,900,207 | A | * | 5/1999 | Danforth ................. B29C 41/36 264/603 |
| 7,354,990 | B2 | | 4/2008 | Hossan et al. |
| 8,158,217 | B2 | | 4/2012 | Shah et al. |
| 8,663,542 | B2 | | 3/2014 | Mutsuda |
| 8,999,453 | B2 | | 4/2015 | Shah et al. |
| 9,255,003 | B2 | | 2/2016 | Keller et al. |
| 9,527,242 | B2 | | 12/2016 | Rodgers et al. |
| 9,745,452 | B2 | | 8/2017 | Hwang et al. |
| 9,803,061 | B2 | | 10/2017 | Hattori et al. |
| 9,908,978 | B2 | | 3/2018 | Reese et al. |
| 2003/0056870 | A1 | * | 3/2003 | Comb ................. B29C 67/0055 156/64 |
| 2004/0122174 | A1 | * | 6/2004 | Mather .............. C08G 18/3893 525/191 |
| 2006/0001190 | A1 | * | 1/2006 | Priedeman, Jr. ...... B29C 64/106 264/219 |
| 2006/0134419 | A1 | * | 6/2006 | Monsheimer .......... C08G 65/40 428/402 |
| 2007/0197739 | A1 | * | 8/2007 | Aneja .................... C08L 71/10 525/437 |
| 2008/0315156 | A1 | * | 12/2008 | Flath ................. C08G 65/4012 252/299.5 |
| 2009/0169825 | A1 | * | 7/2009 | Farmer .................. B29C 70/14 428/167 |
| 2009/0234060 | A1 | * | 9/2009 | Haralur .................. C08L 71/00 524/539 |
| 2009/0326152 | A1 | | 12/2009 | Li et al. |
| 2010/0081731 | A1 | * | 4/2010 | Ting ........................ C08J 3/005 523/351 |
| 2010/0271253 | A1 | | 10/2010 | Shah et al. |
| 2010/0327479 | A1 | * | 12/2010 | Zinniel ............... B29C 47/0014 264/172.14 |
| 2011/0104417 | A1 | | 5/2011 | Wang et al. |
| 2011/0171469 | A1 | | 7/2011 | Shah et al. |
| 2011/0297892 | A1 | | 12/2011 | Shah et al. |
| 2012/0070619 | A1 | * | 3/2012 | Mikulak ............. B29C 67/0055 428/156 |
| 2012/0231225 | A1 | * | 9/2012 | Mikulak ............... B29C 47/025 428/172 |
| 2013/0113135 | A1 | * | 5/2013 | Wakabayashi ........ B29C 48/793 264/211.24 |
| 2013/0217838 | A1 | | 8/2013 | Defelice et al. |
| 2013/0337256 | A1 | * | 12/2013 | Farmer ............... B29C 47/0002 428/292.1 |
| 2014/0141166 | A1 | * | 5/2014 | Rodgers .................. C08L 77/02 427/256 |
| 2014/0141168 | A1 | * | 5/2014 | Rodgers .................. C08L 77/02 427/265 |
| 2014/0194579 | A1 | * | 7/2014 | Ramalingam ........... C08L 81/04 525/398 |
| 2015/0028523 | A1 | * | 1/2015 | Jaker ...................... C08G 63/06 264/401 |
| 2015/0051339 | A1 | * | 2/2015 | Brunner .................. B29B 7/482 524/585 |
| 2015/0145168 | A1 | * | 5/2015 | Rodgers ............. B29C 67/0055 264/308 |
| 2015/0147506 | A1 | | 5/2015 | Korzhenko et al. |
| 2015/0251353 | A1 | * | 9/2015 | Rodgers ............... B29C 64/153 264/406 |
| 2015/0259530 | A1 | * | 9/2015 | Rodgers .................. C08L 77/06 524/538 |
| 2015/0274588 | A1 | * | 10/2015 | DeFelice ............... D06M 15/53 428/392 |
| 2016/0082641 | A1 | | 3/2016 | Bogucki et al. |
| 2016/0122540 | A1 | | 5/2016 | Brule |
| 2016/0122541 | A1 | | 5/2016 | Jaker et al. |
| 2016/0136887 | A1 | | 5/2016 | Guillemette et al. |
| 2016/0161872 | A1 | * | 6/2016 | Orrock ................. G03G 9/0819 264/484 |
| 2016/0251486 | A1 | * | 9/2016 | Cernohous ............ B29C 48/022 264/308 |
| 2016/0297935 | A1 | | 10/2016 | Reese |
| 2017/0096576 | A1 | | 4/2017 | Bheda et al. |
| 2017/0198104 | A1 | | 7/2017 | Bheda |
| 2018/0142070 | A1 | | 5/2018 | Reese et al. |
| 2018/0201737 | A1 | * | 7/2018 | Bheda ..................... C08J 3/005 |

FOREIGN PATENT DOCUMENTS

| | | |
|---|---|---|
| EP | 2290001 B1 | 10/2017 |
| EP | 3242908 A1 | 11/2017 |
| WO | 03089702 A1 | 10/2003 |
| WO | 2007035402 A2 | 3/2007 |
| WO | 2007035404 A1 | 3/2007 |
| WO | WO-2017062459 A1 | 4/2017 |
| WO | WO-2017126476 A1 | 7/2017 |
| WO | WO-2017126477 A1 | 7/2017 |
| WO | WO-2017149896 A1 | 9/2017 |

OTHER PUBLICATIONS

Office Action dated Jun. 15, 2017 for U.S. Appl. No. 14/682,067.
Office Action dated Sep. 8, 2016 for U.S. Appl. No. 14/682,067.
Co-pending U.S. Appl. No. 15/945,443, filed Apr. 4, 2018.
MakeitFrom.com, "Compare PAS to PEI", Website: http:/www.makeitfrom.com/compare/Polyarysulfone-PAS/Polyethermide-PEI, Printed Jul. 20, 2017, 6 pp.
Maletzko, et al. "Polyarylsulfones", High-performance Plastics Trend Report, Kunststoffe international Oct. 2011, Cari Hanser Verlag, Munich, pp. 56-60.
Notice of allowance dated Dec. 6, 2017 for U.S. Appl. No. 14/682,067.
Office action dated Aug. 28, 2017 for U.S. Appl. No. 14/297,185.
Office action dated Dec. 14, 2017 for U.S. Appl. No. 14/297,185.
Solvay. AvaSpire® PAEK—Customized high-performance polyketones. Available at https://www.solvay.com/en/markets-and-products/featured-products/avaspire.html. Accessed on Dec. 19, 2017.
Solvay. Torlon® 4203L. Available at https://www.solvay.com/en/markets-and-products/products/detail.html?productId=688&productName=Torlon%C2%AE+4203L. Accessed on Dec. 19, 2017.
Solvay. Torlon® PAI. Get the Best of Both World. Available at https://www.solvay.com/en/markets-and-products/featured-products/torlon.html. Accessed on Dec. 19, 2017.
Wikipedia. Polyamide-imide. Available at https://en.wikipedia.org/wiki/Polyamide-imide. Accessed on Dec. 19, 2017.
Rafael Kiebooms, "International Search Report", Internat'l. Patent Appln. No. PCT/US2016/055505, dated Feb. 6, 2017, Publisher: PCT, Published in: WO.
Rozanski, et al. Modification of amorphous phase of semicrystalline polymers. Polimery . 2012, vol. 57 Issue 6, p. 433-440.
Co-pending No. U.S. Appl. No. 16/032,969, filed Jul. 11, 2018.
U.S. Appl. No. 15/865,018 Office Action dated Jan. 25, 2019.
U.S. Appl. No. 16/032,969 Office Action dated Feb. 25, 2019.
Final Office Action dated Jul. 21, 2020, issued in U.S. Appl. No. 15/945,443.
Non-Final Office Action dated Mar. 20, 2020, issued in U.S. Appl. No. 15/865,018.
Sauer and Hsiao, "Glass Transition, Crystallization, and Morphology Relationships in Miscible Poly(aryl ether ketones) and Poly(ether imide) blends", Journal Of Polymer Science: Part B: Polymer Physics, vol. 31, 901-915 (1993).
Examination Report for EP Application No. 16788843.7 dated Apr. 9, 2019.
First Office Action in CN Application No. 2016800682686, dated Feb. 6, 2020 with English Translation 21 pages.
Written Opinion in International Application No. PCT/US2016/055505, dated Jun. 2, 2017, 4 pages.
Office Action for U.S. Appl. No. 15/945,443 dated Nov. 25, 2019.
Office Action in U.S. Appl. No. 15/922,302 dated Apr. 9, 2020.

(56) References Cited

OTHER PUBLICATIONS

Non-Final Office Action issued in U.S. Appl. No. 15/945,443 dated Feb. 4, 2021,.
Second Office Action issued in Chinese application No. 2016800682686 dated Oct. 27, 2020.
Third Office Action issued in corresponding Chinese application No. 20168006820686 dated Mar. 18, 2021.
Decision of Rejection issued in Chinese application No. 2016800682686 dated Jun. 28, 2021.

* cited by examiner

AMORPHOUS POLYARYLETHERKETONE AND BLENDS THEREOF FOR USE IN ADDITIVE MANUFACTURING

FIELD OF THE INVENTION

The present invention generally relates to compositions for use in additive manufacturing, more commonly known as "3D printing."

BACKGROUND OF THE INVENTION

The additive manufacturing process is widely known as the three-dimensional ("3D") printing of objects. There are a variety of 3D-printing processes, the most common of which are solid-laser sintering ("SLS"), stereolithography ("SLA"), and extrusion-based 3D printing or FFF (fused-filament fabrication).

Extrusion-based 3D printing involves the deposition of thermoplastic materials. This process fabricates a three-dimensional object from a mathematical model of the object using materials such as thermoplastics and metals that are typically in the form of a filament. In the case of a thermoplastic material, the object is built by feeding a thermoplastic filament into a heated extrusion head. The thermoplastic is heated past its glass transition temperature and then deposited by the extrusion head as a series of beads in a continuous motion. After deposition, the bead quickly solidifies and fuses with the beads next to and below it. The nozzle of the extrusion head follows a tool-path controlled by a computer-aided manufacturing (CAM) software package, and the object is built from the bottom up, one layer at a time.

Prototyping is currently the most common application for extrusion-based printing, using materials such as acrylonitrile butadiene styrene (ABS), polylactic acid (PLA), methyl methacrylate acrylonitrile butadiene styrene copolymer (ABSi), and polycarbonate (PC), among others.

Toward the end of printing production-suitable parts, higher-end engineering semi-crystalline and amorphous polymers, as well as metals and ceramics with greater mechanical, chemical, thermal, and electrical properties are being used. Examples of semi-crystalline polymers include, among others, semi-crystalline polyaryletherketones (PAEK), polyetheretherketone (PEEK), and polyetherketoneketone (PEKK). Examples of amorphous engineering polymers include polyphenylsulphone (PPSU) and polyetherimide (PEI), among others.

Amorphous polymers are relatively easy to process via FFF. Unfortunately, these polymers tend to have relatively poor chemical resistance, poor heat resistance, and inferior mechanical properties such that the FFF-printed parts formed therefrom are often not suitable for production (as opposed to prototyping) applications.

Semi-crystalline thermoplastic PEEK, mentioned above, has exceptionally high tensile and flexural strength compared to other polymers and can perform under load at high temperatures. Its chemical resistance and tolerance to steam and hot water have enabled its use in high-strength applications in the medical and oil & gas industries.

Although parts formed from PEEK have been printed using FFF, this polymer introduces challenges to the 3D-printing process due to its semi-crystalline morphology. In particular, more advanced build platforms and enclosures are required to manage the high ambient temperature during printing. Furthermore, this semi-crystalline polymer has a longer cooling time compared to lower temperature amorphous materials, which increases the minimum layer time and requires the use of cooling to speed up solidification. FFF-printed PEEK parts also experience more significant shrinkage and warpage compared to parts printed from amorphous materials. This leads to decreased dimensional accuracy and larger tolerances for FFF-printed PEEK parts. The increased warpage can also result in part separation from the build surface unless high build-chamber temperatures (c.a. 280 to 310° Celsius) are used. Additionally, PEEK has higher melt flows requiring higher pressures during extrusion and printing compared to amorphous materials.

To overcome the problems associated with FFF-printing using PEEK, the present inventors have blended PEEK with other amorphous thermoplastics, as disclosed in U.S. patent application Ser. No. 14/297,185. These compositions have been optimized for the FFF printing process allowing large, complex production parts to be formed. Although easier to process than neat semi-crystalline PEEK, these PEEK blends do not exhibit the superior mechanical, thermal, and chemical resistivity properties of neat PEEK.

A need therefore remains for materials for use in FFF printing that are relatively easy to process and will result in printed parts that exhibit high chemical resistance, high heat resistance, and high strength such that the parts can be used as a production/working part in relatively demanding applications, such as arises in the aerospace, healthcare, and oil & gas industries.

SUMMARY

The present invention provides a material for use in FFF-printing that avoids some of the drawbacks of the prior art.

In accordance with the present teachings, a resin comprising an amorphous form of a (normally semi-crystalline) polyaryletherketone (PAEK) is used for forming production parts via FFF. In the illustrative embodiment, the PAEK is amorphous PEEK. In various embodiments, the resin comprises:
- one amorphous PAEK compound (e.g., PEEK, etc.);
- one type of amorphous PAEK (e.g., PEEK, etc.) but at least two versions thereof, each having a different measure of amorphousness (i.e., one relatively less amorphous, one relatively more amorphous) from the other;
- two or more different amorphous PAEKs (e.g., PEEK and PEKK, etc.);
- at least one PAEK compound in amorphous form and at least one amorphous compound that is not a PAEK compound;
- at least one amorphous PAEK and at least one semi-crystalline PAEK, wherein the PAEK compound is the same (e.g., amorphous PEEK and semi-crystalline PEEK, etc.);
- at least one amorphous PAEK and at least one semi-crystalline PAEK, wherein the PAEK compound is different (e.g., amorphous PEEK and semi-crystalline PEKK, etc.);
- at least one amorphous PAEK and at least one semi-crystalline compound that is not a PAEK compound;
- combinations of the foregoing.

Semi-crystalline PAEK has a relatively high viscosity and melt flow and therefore requires relatively high pressure force it through an extrusion head of an FFF printer during printing. On the other hand, amorphous PAEK and blends thereof in accordance with the present teachings exhibit the relatively more desirable rheological properties of a higher melt mass-flow rate that is characteristic of a lower temperature, common amorphous polymer. In other words, the use of amorphous PEEK or other amorphous forms of other PAEK compounds decreases the viscosity sufficiently to reduce the pressure required to print the polymer blend via FFF.

Furthermore, semi-crystalline PAEK has an increased shrinkage and warpage compared to amorphous polymers, requiring the use of high-temperature heating beds, a slower print speed, and/or the use of cooling to maintain geometrical accuracy around critical object features and to prevent the part from pulling off the build plate. According to the present invention, the use of amorphous PAEK or blends thereof exhibit less warpage or shrinkage given its lower coefficient of thermal expansion and contraction. In other words, the use of amorphous PAEK allows the material to adhere better to the build surface and may produce tighter geometrical tolerances.

The addition of amorphous PAEK to semi-crystalline PAEK can increase the heat resistance and maximum operating temperature compared to conventional materials used for FFF.

DETAILED DESCRIPTION

Figure 1:
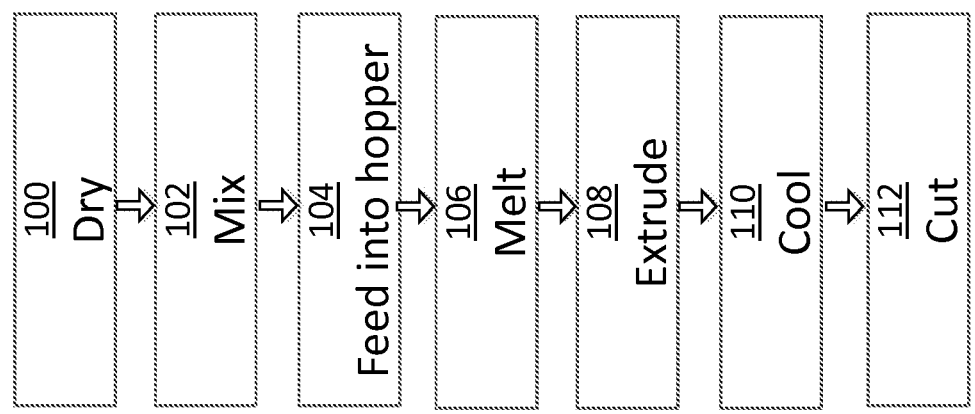
FIG. 1 depicts a flow diagram of a first method for preparing a blend of polymers, including at least one amorphous PAEK compound, in accordance with an illustrative embodiment of the present invention.

Although the illustrative embodiment is directed to the use of amorphous PEEK in conjunction with FFF printing, any polyaryletherketone (PAEK) that can be synthesized to exhibit a predominantly amorphous morphology can be used to print production-quality parts.

The crystallization of polymers is a process associated with partial alignment of their molecular chains. The fraction of the ordered molecules in a polymer is characterized by the degree of crystallinity, which typically ranges between 10% and 80% For this reason, crystallized polymers are often called "semi-crystalline," A polymer with less than 10% crystallinity is considered to be "amorphous." Degree of amorphous is the inverse of degree of crystallinity. For example, a polymer with a crystallinity of 5% has a greater degree of amorphousness than a polymer having a crystallinity of 9%.

The degree of crystallinity is estimated by different analytical methods, such as density measurement, differential scanning calorimetry (DSC), infrared spectroscopy, nuclear magnetic resonance (NMR), and X-ray diffraction (XRD). In addition, the distribution of crystalline and amorphous regions (and hence degree of crystallinity) can be visualized with microscopic techniques, such as polarized light microscopy and transmission electron microscopy. The numbers for (degree of) crystallinity provided herein are based on DSC, unless otherwise indicated.

PAEK thermoplastics include: PEEK, PEKK, polyetherketone PEK, polyetheretherketoneketone PEEKK, and polyetherketoneetherketoneketone PEKEKK. To the extent this Detailed Description references PEEK or any other specific PAEK, it will be understood that these teachings apply more generally to any PAEK compound unless otherwise specified.

PAEK is characterized by phenylene rings that are linked via oxygen bridges (ether and carbonyl groups (ketone)). The ether-to-ketone ratio and sequence in the PAEK affects its glass transition temperature and melting point. This ratio and sequence also affects the heat resistance and processing temperature of the PAEK. The higher the ratio of ketones, the more rigid the polymer chain, which results in a higher glass transition temperature and melting point. The processing temperatures can range from about 350 to 430° C.

PEEK is commercially manufactured as a semi-crystalline thermoplastic using step-growth polymerization of bis-phenolate salts. PEEK is usually manufactured with a degree of crystallinity in the range of about 25 to 35%.

In accordance with the illustrative embodiment and unlike conventional practice, PEEK is manufactured to exhibit an amorphous morphology (i.e., lower degree of crystallinity) by altering the process conditions during polymerization.

One method to achieve amorphous PEEK is to continue the step-growth polymerization, creating very high molecular weight grades. The polymerization processing conditions must be carefully controlled to enable the polymerization process to continue. For example, the amount of initial monomers added must be limited and precisely measured. An excess of one type of monomeric reagent over another can limit the molecular weight. The reactants must have a high purity to prevent the occurrence of side reactions from contaminates. The viscosity of the polymerization medium must be controlled to promote continued step reactions. Finally, solid-state polycondensation can be used as a post-processing step to further increase the molecular weight.

Furthermore, incorporating certain additives during polymerization can prevent or restrict the organization of crystalline chains. For example, reactants containing bulky side groups (e.g., multiple benzene rings, etc.) can be added to the ends of the polymer chains. These bulky side groups prevent the polymer from organizing into a crystalline morphology. Amorphous PEEK exhibits a higher toughness and ductility compared to semi-crystalline PEEK, but generally has a lower tensile strength and chemical resistivity.

In light of the present disclosure, those skilled in the art will be able to apply the foregoing techniques and others to suitably control the polymerization process to produce amorphous PEEK and other amorphous PAEK compounds.

The amorphous PAEK compound can be extruded into filament for use in the FFF-printing process. In some embodiments, a semi-crystalline PAEK compound and an amorphous PAEK compound are blended together to improve the mechanical performance (i.e., tensile strength and Young's modulus) and increase the chemical resistance (as measured, for example, via ASTM D543) of the resulting FFF-printed part, as compared to using amorphous PEEK alone.

Semi-crystalline thermoplastics other than semi-crystalline PAEK compounds can be blended with the amorphous PEEK to achieve specific material properties or FFF processing properties. For example and without limitation, semi-crystalline resins such as polyimide, polyethylene, nylon, polyphenylene sulfide, and polyphthalamide can be used.

Also, amorphous compounds other than amorphous PAEK compounds can be blended with one or more amorphous PAEK compounds to achieve specific material properties or FFF processing properties. For example and without limitation, amorphous resins such as polyetherimide (PEI commonly known as Ultem®), polyethersulfone (PES), polysulfone (PSU commonly known as Udel®), polyphenylsulfone (PPSU commonly known as Radel®), polyphenylene oxides (PPOs), acrylonitrile butadiene styrene (ABS), polylactic acid (PLA), polyglycolic acid (PGA), polyamide-imide (PAI commonly known as Torlon®), polystyrene (PS), polyamide (PA), polybutylene terephthalate (PBT), poly(p-phenylene sulfide) (PPS), polyethersulfone (PESU), polyethylene ether (commonly known as PrimoSpire®), and polycarbonate (PC).

Thus, in various embodiments, a resin for a FFF-printing process includes:
  (i) One type of amorphous PAEK (e.g., PEEK, etc.);
  (ii) One type of amorphous PAEK (e.g., PEEK, etc.) but at least two versions thereof with differing degrees of amorphousness (i.e., one relatively less amorphous, one relatively more amorphous);
  (iii) Two or more different amorphous PAEKs (e.g., PEEK and PEKK, etc.);
  (iv) At least one amorphous PAEK and at least one amorphous compound that is not a PAEK compound;
  (v) At least one amorphous PAEK and at least one semi-crystalline PAEK, wherein the PAEK compound(s) is the same (e.g., amorphous PEEK and semi-crystalline PEEK, etc.);
  (vi) At least one amorphous PAEK and at least one semi-crystalline PAEK, wherein the PAEK compound is the different (e.g., amorphous PEEK and semi-crystalline PEKK, etc.);
  (vii) At least one amorphous PAEK and at least one semi-crystalline compound that is not a PAEK compound; and
  (viii) Any combinations of (i) through (vii). For example, variations on (v) or (vi) with (ii), wherein multiple versions of the amorphous PEAK(s) with differing degrees of amorphousness and/or multiple versions of the semi-crystalline PAEK(s) with different semi-crystallinity; etc.

In some embodiments, the mixing or compounding of the blend of amorphous and semi-crystalline thermoplastic polymers (e.g., PEEK, etc.) takes place before filament extrusion. In such embodiments, the polymers are heated above their processing temperatures and are well mixed. The resulting resin is a homogenous blend of multiple polymers.

In some other embodiments, the mixing or compounding of the blend of amorphous and semi-crystalline thermoplastic polymers (e.g., PEEK, etc.) occurs through melt blending during filament extrusion. In such embodiments, the pellets of the polymers are mixed and then added to the hopper of the filament extruder. The materials are then melted in the barrel and mixed as the extruder screw rotates. Although this method is more cost-effective and requires one less step than pre-compounding, it may not yield a completely homogenous polymer blend.

In some embodiments, the weight ratio of (total) amorphous PAEK to (total) semi-crystalline PAEK is in a range of about 50:50 to about 95:5, inclusive. The ratio selected for any particular application may vary primarily as a function of the materials used and the properties desired for the printed object.

The blend of amorphous PEEK with semi-crystalline PEEK can result in miscible, immiscible, or compatible polymer blends. If the polymers are miscible, the blend will have one glass transition temperature modeled by the Fox Equation.

$$\frac{1}{T_g} = \frac{w_1}{T_{g,1}} + \frac{w_2}{T_{g,2}}$$

Considering a specific example, if PEEK (Tg=143° C.) is blended with polyethylene ether (Tg=168° C.) with in a ratio of 40 to 60% respectively, the resulting Tg would be 157° C. If the polymers are immiscible or compatible, the blend will have two or more glass transition temperatures characteristic of the individual polymers.

As described in prior art, both miscible and immiscible blends have demonstrated an increase in mechanical properties compared to the properties of each polymer in the blend assuming the appropriate mixing technique is used (Ibrahim & Kadum, 2010). With the use of amorphous PEEK in a polymer blend, extremely high strength polymer blends for 3D printing result.

In another embodiment, the blended material may include two or more thermoplastic materials. In embodiments in which multiple materials are used to form the blended material, the total amount of each type of material should fall within the ratio guidelines provided above.

In yet another embodiment, a solid non-polymer filler material having a higher melting temperature than the thermoplastic polymer material(s) can be added to the blend to improve mechanical properties of the 3D objects. The amount of the filler material by weight is up to about 60%, and more preferably between 5% and 20% of the total blend. The filler material can include chopped carbon fibers, chopped glass fibers, chopped aramid/Kevlar fibers, continuous carbon fiber, continuous glass fiber, continuous polyethylene fiber, milled carbon, milled glass, graphite, graphene, carbon nanotubes, and graphene nanoplatelets. Preferably, the fibers are suspended and mixed in the blend during its fabrication. In an exemplary embodiment, the fibers are treated or sized for the specific resin of choice and then encapsulated or coated with resin to ensure sufficient wetting with the polymer.

Blending.

If a blend of polymers (e.g., multiple amorphous polymers, amorphous and semi-crystalline polymers, etc.) is being prepared, it can be prepared as shown in FIG. 1. The materials to be blended are typically provided in pellet or powder form. In step 100, the materials are dried in a dryer to remove moisture in order to prevent hydrolysis of polymer that can reduce polymer chain length resulting in poorer properties. In step 102, the dried materials in powder form are physically and thoroughly mixed in a mixing device. In step 104, the mix is then fed to a hopper of an extruder. In one embodiment, a twin-screw extruder is used to melt blend the materials and then extrude the blended material into a strand.

In embodiments in which a filler material is used, it can be added during steps 102 or 104 or in step 114, discussed later herein. In the extruder, the mixed materials are "melted" (step 106). In accordance with one embodiment, the melt blending is performed at a temperature that is: (a) above the glass transition temperature of the amorphous polymer materials, preferably at a temperature at which the polymer is fluid; (b) above the melting point of semi-crystalline polymer materials (if present); and (c) below the polymer degradation temperature of all amorphous and semi-crystalline materials. A typical melt blend temperature for the various PAEK polymers will be in the range of about 360 to about 370° C.

In embodiments in which more than one amorphous polymer material is used in the blend, the melt blending is performed at a temperature that is above the glass transition temperature of all the amorphous polymer materials, at which the polymers behave like a fluid. Likewise, in embodiments in which more than one semi-crystalline polymer material is used, the melt blending is performed at a temperature that is above the melting point of all the semi-crystalline polymer materials that are used in the blend.

In step 108, the melted material passes through a die of the twin-screw extruder and is extruded. In some embodiments, the resulting extrudate is formed into a strand, which is typically about 6 to 13 millimeters (¼-½ inch) in diameter. The melt processing temperature (i.e., the temperature of the material as it is extruded through an extrusion head of a fused-filament fabrication printer) will typically be near the temperature at which the materials are melt blended.

Of course, the melt processing temperature for the blended material will be dictated by the highest melting temperature or highest glass transition temperature of all the amorphous and semi-crystalline materials in the blend, whichever is higher.

Figure 2:
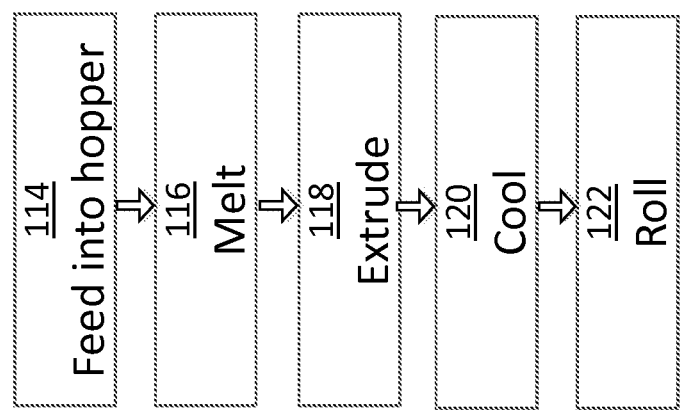
FIG. 2 depicts a flow diagram of a second method for preparing a blend of polymers, including at least one amorphous PAEK compound, in accordance with an illustrative embodiment of the present invention.

After extrusion, in step 110, the strand is cooled, such as in a water bath. In some embodiments, the size of the extrusion die is such that the strand is in a form of a filament having a diameter of 1-2 mm. The filament is then wound as a roll of filament, which can be fed directly into the FFF printer. Alternatively, in step 112, the strand is cut into small pellets for storage. In that case, the pellets will need to be reprocessed into a filament of 1-2 mm in diameter, which is adapted for direct feeding into the FFF printer as illustrated in FIG. 2.

In step 114, the pellets containing the blended materials from step 112 are fed into a hopper of an extruder such as a single or twin-screw extruder. If the filler material is involved, it can be added in this step instead of step 102 or 104. In step 116, the blended pellets are "melted" in the extruder. Similar to step 106, the melting is performed at a temperature that is: (a) above the glass transition temperature of the amorphous polymer materials, preferably at a temperature at which the polymer is fluid; (b) above the melting point of semi-crystalline polymer materials (to the extent present); and (c) below the polymer degradation temperature of all amorphous and semi-crystalline materials. The temperature in the extruder will typically be about 370 to about 380° C.

In step 118, the melted material passes through a die of the extruder and is extruded into a filament, which is typically 1 to 2 mm in diameter. After extrusion, in step 120, the filament is cooled, such as in a water bath and is rolled onto a roll as a final product in step 122, which is suitable to be fed directly into the FFF 3D printer.

To print a 3D object, the filament from the filament roll of the heat blended material is fed to the FFF printer. The filament being fed is then heated by a heater block of the FFF printer to a useable temperature which is above the glass transition temperature of the amorphous material and the melting point of the semi-crystalline material (if present). Typical printing temperature for amorphous PAEK and blends in accordance with the present teachings will be in the range of about 350 to about 370° C. The FFF printer then deposits the heated material in a selected pattern layer by layer in accordance with a mathematical model of the 3D object in order to fabricate the 3D object.

The above disclosure is intended to be illustrative and not exhaustive. This description will suggest many modifications, variations, and alternatives may be made by one of ordinary skill in this art without departing from the scope of the invention. Those familiar with the art may recognize other equivalents to the specific embodiments described herein. Accordingly, the scope of the invention is not limited to the foregoing specification.

What is claimed:

1. A method for forming a filament of a blended material for use as a deposition material in a fused-filament-fabrication (FFF) printer, the method comprising:
    (a) providing (i) a first compound comprising a first polyaryletherketone (PAEK) having an amorphous morphology and (ii) a second compound having a semi-crystalline morphology, wherein a weight ratio of the first compound to the second compound is at least 1:1 and a degree of crystallinity of the second compound is about 80%;
    (b) forming a mixed material by physically mixing the first compound in a powder form and the second compound in a powder form in a mixing device;
    (c) subsequent to (b), feeding the mixed material into a hopper of an extruder, wherein said hopper is different device than the mixing device, and forming the blended material by heating the mixed material to a temperature that is the greater of:
        (1) a glass transition temperature of the first compound, and
        (2) a melting point of the second compound; and
    (d) extruding the blended material through a die of the extruder to form the filament for use in the FFF printer.

2. The method of claim 1, wherein forming the mixed material further comprises adding a filler material whose melting temperature is higher than the glass transition temperature of the first compound and the melting point of the second compound.

3. The method of claim 2, wherein the filler material is selected from the group consisting of chopped carbon fibers, chopped glass fibers, chopped aramid fibers, continuous carbon fiber, continuous glass fiber, continuous polyethylene fiber, milled carbon, milled glass, graphite, graphene, carbon nanotubes, and graphene nanoplatelets.

4. The method of claim 1, wherein the second compound comprises a second PAEK.

5. The method of claim 4, wherein the first PAEK and the second PAEK have the same chemical composition as one another.

6. The method of claim 4, wherein the second PAEK has a different chemical composition than the first PAEK.

7. The method of claim 1, wherein the second compound does not include a PAEK.

8. The method of claim 1, wherein the first compound in (a) further comprises an additional PAEK different than the first PAEK, and wherein in (b) the mixed material includes the additional PAEK.

9. The method of claim 1, wherein the first compound comprises polyetheretherketone.

10. The method of claim 1, further comprising winding the filament into a roll.

11. The method of claim 1, wherein (a) further comprises providing a third compound comprising a second PAEK having an amorphous morphology and having a differing degree of crystallinity than the first PAEK.

12. The method of claim 4, wherein the first PAEK and the second PAEK are independently selected from the group consisting of polyetherketone (PEK), polyetheretherketone (PEEK), and polyetherketoneketone (PEKK).

13. The method of claim 7, wherein the second compound is selected from the group consisting of polyetherimide (PEI), polyethersulphone (PES), polysulfone (PSU), polyphenylsulfone (PPSU), polylactic acid (PLA), polyglucolic acid (PGA), polyamide-imide (PAI), polystyrene (PS), polyamide (PA), poly(p-phenylene sulfide (PPS), polyethersulfone (PESU), and polycarbonate (PC).

14. The method of claim 1, further comprising, prior to (b), drying the first compound and the second compound to remove moisture from the first compound and the second compound.

* * * * *